United States Patent
Harvey

(10) Patent No.: US 7,313,656 B1
(45) Date of Patent: Dec. 25, 2007

(54) PRE-FETCH PREDICTION METHOD FOR DISK DRIVES

(75) Inventor: David W. Harvey, Newton, MA (US)

(73) Assignee: EMC Corporation, Hopkinton, MA (US)

(*) Notice: Subject to any disclaimer, the term of this patent is extended or adjusted under 35 U.S.C. 154(b) by 281 days.

(21) Appl. No.: 11/023,000

(22) Filed: Dec. 27, 2004

(51) Int. Cl.
G06F 12/00 (2006.01)
G06F 13/00 (2006.01)
G06F 13/28 (2006.01)

(52) U.S. Cl. .................. 711/137; 711/112; 711/113; 712/207

(58) Field of Classification Search ............ 711/137, 711/213; 712/207
See application file for complete search history.

(56) References Cited

U.S. PATENT DOCUMENTS

| | | | | |
|---|---|---|---|---|
| 4,774,654 A | * | 9/1988 | Pomerene et al. | 711/122 |
| 5,515,518 A | * | 5/1996 | Stiles et al. | 712/239 |
| 5,890,211 A | * | 3/1999 | Sokolov et al. | 711/113 |
| 5,940,594 A | * | 8/1999 | Ali et al. | 709/203 |
| 5,970,508 A | * | 10/1999 | Howe et al. | 711/113 |
| 6,026,471 A | * | 2/2000 | Goodnow et al. | 711/137 |
| 6,085,193 A | * | 7/2000 | Malkin et al. | 707/10 |
| 6,275,918 B1 | * | 8/2001 | Burky et al. | 711/213 |
| 6,295,582 B1 | * | 9/2001 | Spencer | 711/135 |
| 6,317,818 B1 | * | 11/2001 | Zwiegincew et al. | 711/213 |
| 6,338,120 B1 | * | 1/2002 | Hanley | 711/136 |
| 6,516,389 B1 | * | 2/2003 | Uchihori | 711/137 |
| 7,058,767 B2 | * | 6/2006 | Dodson et al. | 711/137 |
| 7,089,370 B2 | * | 8/2006 | Luick | 711/137 |

* cited by examiner

*Primary Examiner*—Donald Sparks
*Assistant Examiner*—Fred W Detschel

(57) ABSTRACT

A pre-fetch method for a data storage system having disk drives and a cache memory. The method generates a history as pages are from the disk drives for storage in the cache memory, such history indicating whether a page previous to the requested page is already in the cache memory. The history generation is used during subsequent requests to determine, when a page is again requested, the number of pages that are to be read from the disk drive into the cache memory, the number of pages to be read being determined from the generated history.

2 Claims, 10 Drawing Sheets

History States:
U [00] – Unknown

D [10] – Don't read when previous page read
R [11] – Read when previous page read

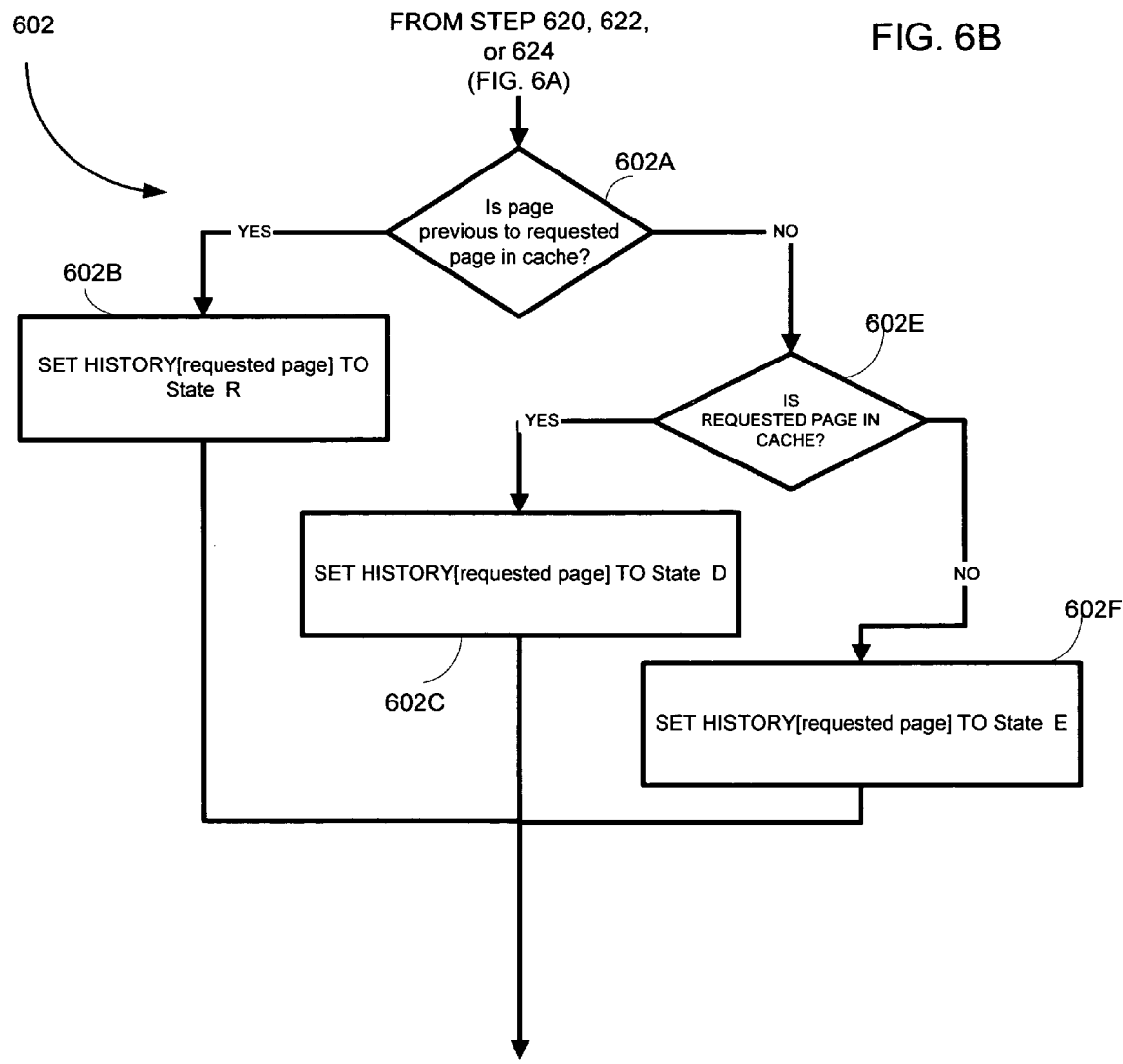

PRE-FETCH PREDICTION METHOD FOR DISK DRIVES

TECHNICAL FIELD

This invention relates generally to data storage systems and more particularly to methods for pre-fetch prediction for disk drives used in such data storage systems.

BACKGROUND

As is known in the art, large mainframe computer systems such as host computers or servers require large capacity data storage systems. One type of data storage system is a magnetic disk storage system. Here, a bank of disk drives and host computer/server are coupled together through an interface. The interface includes CPU, or "front end", controllers (or directors) and "back end" disk controllers (or directors). The interface operates the controllers (or directors) in such a way that they are transparent to the host computer/server. That is, data is stored in, and retrieved from, the bank of disk drives in such a way that the host computer/server merely thinks it is operating with one mainframe memory. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the CPU controllers (or directors) and disk controllers (or directors), addressable cache memories, i.e., cache. The cache memory is a semiconductor memory and is provided to rapidly store data from the main frame computer system before storage in the disk drives, and, on the other hand, store data from the disk drives prior to being sent to the main frame computer. The cache memory being a semiconductor memory, as distinguished from a magnetic memory as in the case of the disk drives, is much faster than the disk drives in reading and writing data. Another type of interface is described in U.S. Pat. No. 6,651,130 issued Nov. 18, 2003, entitled data Storage System Having Separate Data Transfer Section and Message Network With Bus Arbitration, inventor Thibault, assigned to the same assignee as the present invention, the entire subject matter thereof being incorporated herein by reference. As described therein during a read operation, when data is requested by the host computer/server, the system interface first queries the cache memory to determined whether the data is in cache, i.e., a read "hit". If in cache, the data is sent from cache to the host computer/server. On the other hand, if the requested data is not in cache, i.e., a read "miss", the interface reads the data from the disk drives and then stores the data read from the disk drives into cache. The interface then reads the data from cache and sends it to the host computer/server.

As is also known in the art, it is desirable to predict host computer/server reads and thereby read data into cache before the host computer/server requests it to thereby improve latency and throughput. One technique used is a disk drive data prefetch. Here, caches use prefetch predictions based on recent history. Prefetch predictions use recent history to attempt to predict how much data to read from the disk drive and then load into cache. They are attempting to predict the length (i.e., number of successive pages of the disk drive) to read. For disk arrays, a logically sequential run is typically also physically sequential (or striped sequentially across multiple disks). When a read is requested from an area of the disk that is not in the cache, the prefetch algorithm starts to collect data to determine how much to read from the disk using the current state of the cache itself. As more reads request to that area are issued, more data is collected into the cache. Because they use only short-term history, prefetch algorithms will typically under-predict the length of a sequential run at the beginning and over-predict the length at the end. The initial under-prediction incurs extra latency, and the over-prediction at the end wastes disk time and cache space.

One example of a short-term prefetch algorithm is shown in FIG. 1. In this example, the disk drive stores data A through M. The disk drive has successive storage slots or pages, 1 through 26 as shown in FIG. 2A. Data A through F are stored on successive disk drive pages 1 through 6, respectively, as shown in FIG. 2A. Data G is stored in page 21, data H in page 24, data I in page 23, data J in page 22, data K in page 25, data L in page 26 and data M in page 20, as shown.

Referring now also to FIG. 1, the host computer/server will sequentially request data A through M. When the host computer/server requests data A, the algorithm shown in FIG. 1 results in data A (which is in page 1) being read from disk and stored in cache and then sent to the host computer/server. It is first assumed that the cache is empty.

When the host computer/server requests data B, the algorithm causes data B (which is in page 2) to be stored in cache and then transferred to the host computer/server. It is first noted that, storage on the disk drives 141 is organized into pages, where each page contains a fixed amount of data (e.g., 4096 bytes). Each page on a disk drive has a page numerical designation, i.e., page number, which uniquely physically identifies the page on the drive. A read from a disk drive 141 must specify the first page to read from and the number of pages to read. For a given page or requested, the previous page to the given, or requested page, is the page which has a page number exactly one less than the given page. Similarly, the next page is the page that has a page number exactly one greater. Thus, as used herein, the term "previous" page to a requested page means physically preceding the requested page. More particularly, the pages are positioned successively on the disk drive. The term "previous" page means the page positioned physically on the disk drive in a position preceding the position on the disk drive of the requested page. Further, in the example in FIG. 2A, the data is read sequentially in time alphabetically; thus, the time sequence of the requested data is A, B, C, D, E, F, G, H, I, J, K, L, M, etc.

The algorithm also notes that page 2 follows page 1 (i.e., page 1 is the page previous to page 2) which was read from disk and thus the next page, i.e., page 3, is read from disk and stored in cache; i.e., the data in page 3 is prefetched. It is noted that page 3 has data C. Thus, data C was prefetched when data B was requested.

When the host computer/server requests data C the algorithm notes that data C was prefetched and is already in cache, i.e., a "hit".

When the host computer/server requests data D, the algorithm causes data D (which is in page 4) to be stored in cache and then transferred to the host computer/server. The algorithm also notes that page 4 follows page 3 (i.e., the previous page) which was read from disk and thus the next page, i.e., page 5, is read from disk and stored in cache; i.e., the data in page 5 is prefetched. It is noted that page 5 has data E. Thus, data E was prefetched when data D was requested.

When the host computer/server requests data E the algorithm notes that data E was pre-fetched and is already in cache, i.e., a "hit".

When the host computer/server requests data F, the algorithm causes data F (which is in page 6) to be stored in cache and then transferred to the host computer/server. The algorithm also notes that page 6 follows page 5 (i.e., the previous page) which was read from disk and thus the next page, i.e., page 7, is read from disk and stored in cache; i.e., the data in page 7 is prefetched. Note that page 7 is never requested by the host computer/server in this example.

When the host computer/server requests data G, the algorithm causes data G (which is in page 21 to be stored in cache and then transferred to the host computer/server. The algorithm also notes that the previous page 20 has not been requested so there is no prefetch.

When the host computer/server requests data H, the algorithm causes data H (which is in page 24 to be stored in cache and then transferred to the host computer/server. The algorithm also notes that previous page 23 has not been requested so there is no prefetch.

When the host computer/server requests data I, the algorithm causes data I (which is in page 23 to be stored in cache and then transferred to the host computer/server. The algorithm also notes that previous page 22 has not been requested so there is no prefetch.

When the host computer/server requests data J, the algorithm causes data J (which is in page 22 to be stored in cache and then transferred to the host computer/server. The algorithm also notes that previous page 21 has been requested, so prefetch is considered, but page 23 is already in cache, so there is no prefetch.

When the host computer/server requests data K, the algorithm causes data K (which is in page 25 to be stored in cache and then transferred to the host computer/server. The algorithm also notes that previous page 24 has been requested so there is a prefetch of the data on next page 26, i.e., data L. Thus, data L was prefetched when data K was requested.

When the host computer/server requests data L the algorithm notes that data L was prefetched and is already in cache, i.e., a "hit".

When the host computer/server requests data M, the algorithm causes data M (which is in page 20) to be stored in cache and then transferred to the host computer/server. The algorithm also notes that previous page 19 has not been requested so there is no prefetch. While the algorithm shown in FIG. 1 reduces the number of read requests from 13 to 10, in this example, it would be desirable to reduce the number of read requests further, while avoiding reading pages that will not be referenced by the host computer/server.

SUMMARY

In accordance with the present invention a pre-fetch method for a data storage system having a disk drive and a cache memory is provided. The method includes generating a history as pages are requested from the disk drive for storage in the cache memory, such history for each requested page indicating whether the page previous to the requested page was in the cache memory when the history was generated; and subsequently to such history generation, determining, when a page is again requested, the number of pages to be read from the disk drive into the cache memory, the number of pages to be read being determined from the generated history for the next pages, where those next pages immediately follow in position on the disk the position on the disk of the requested page.

In one embodiment, the method includes generating a history as pages are requested by a host computer/server and read from disk drives and stored in cache memory, such history indicating whether a page previous to the requested page is in cache. The method provides in such generated history for each requested page either a first designation (R) for the requested page if the page previous to the requested page is in cache memory at the time of the history generation or a second designation (D) if the page previous to the requested page is not in cache memory. The generated history is used during subsequent requests to determine, when the page is again requested, the number of pages to be read from the disk drive into the cache memory, the number of pages to be read being determined, when the next page is not in cache, from the provided first or second designations.

In one embodiment, the method includes generating a history as pages are requested from disk drives and stored in cache memory, such history indicating whether a page previous to the requested page is in cache at the time of history generation. The method provides in such generated history for each requested page either a first designation (R) for the requested page if the page previous the requested page is in cache at the time of the history generation or a second designation (D) if the page previous the requested page is not in cache. The generated history is used during subsequent requests to determine, when the page is again requested, the number of pages to be read from the disk drive into the cache memory, the number of pages to be read being determined, when the next page is not in cache memory and has the first designation (R), by incrementing the next page until the next pages in cache memory has the second designation (D)

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 6A and 6B are flow diagrams of a prefetch method used by the data storage system of FIG. 3 in accordance with yet another embodiment of the invention.

Like reference symbols in the various drawings indicate like elements.

DETAILED DESCRIPTION

Figure 3:
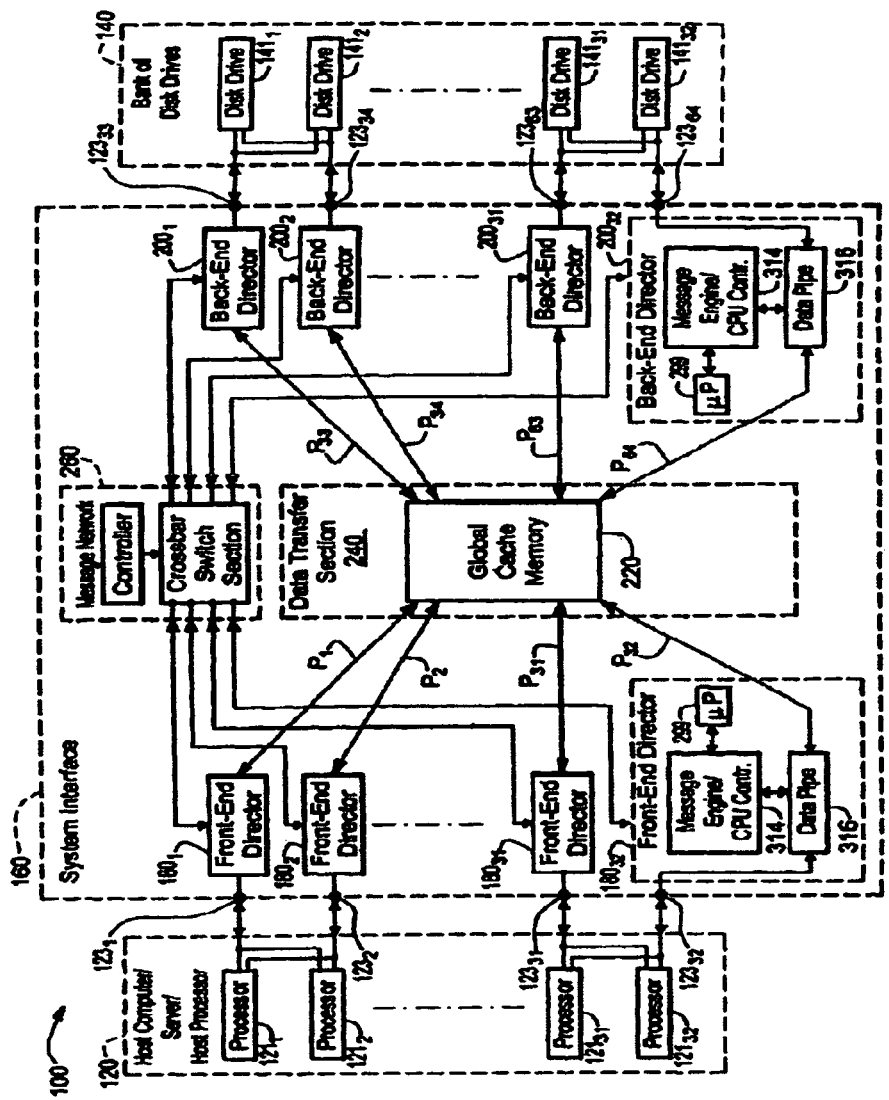
FIG. 3 is a block diagram of a data storage used adapted to prefetch data from a disk drive thereof in accordance with the invention.

Referring now to FIG. 3, a data storage system is shown operating to prefetch data from a bank of disk drives in accordance with a method to be described in connection with the flow diagrams in FIGS. 4A-4C. Suffice it to say here that the system 100 includes a cache memory 220 in the data transfer section 240 is not burdened with the task of transferring the director messaging. Rather the messaging network 260 operates independent of the data transfer section 240 thereby increasing the operating bandwidth of the system interface 160.

In operation, and considering first a read request by the host computer/server 120 (i.e., the host computer/server 120 requests data from the bank of disk drives 140), the request is passed from one of a plurality of, here 32, host computer processors $121_1$-$121_{32}$ in the host computer 120 to one or more of the pair of the front-end directors $180_1$-$180_{32}$ connected to such host computer processor $121_1$-$121_{32}$. (It is noted that in the host computer 120, each one of the host computer processors $121_1$-$121_{32}$ is coupled to here a pair (but not limited to a pair) of the front-end directors $180_1$-$180_{32}$, to provide redundancy in the event of a failure in one of the front end-directors $181_1$-$181_{32}$ coupled thereto. Likewise, the bank of disk drives 140 has a plurality of, here 32, disk drives $141_1$-$141_{32}$, each disk drive $141_1$-$141_{32}$ being coupled to here a pair (but not limited to a pair) of the back-end directors $200_1$-$200_{32}$, to provide redundancy in the event of a failure in one of the back-end directors $200_1$-$200_{32}$ coupled thereto). Each front-end director $180_1$-$180_{32}$ includes a microprocessor (μP) 299 (i.e., a central processing unit (CPU) and RAM) and will be described in detail in connection with FIGS. 5 and 7. Suffice it to say here, however, that the microprocessor 299 makes a request for the data from the global cache memory 220. The global cache memory 220 has a resident cache management table, not shown. Every director $180_1$-$180_{32}$, $200_1$-$200_{32}$ has access to the resident cache management table and every time a front-end director $180_1$-$180_{32}$ requests a data transfer, the front-end director $180_1$-$180_{32}$ must query the global cache memory 220 to determine whether the requested data is in the global cache memory 220. If the requested data is in the global cache memory 220 (i.e., a read "hit"), the front-end director $180_1$-$180_{32}$, more particularly the microprocessor 299 therein, mediates a DMA (Direct Memory Access) operation for the global cache memory 220 and the requested data is transferred to the requesting host computer processor $121_1$-$121_{32}$.

If, on the other hand, the front-end director $180_1$-$180_{32}$ receiving the data request determines that the requested data is not in the global cache memory 220 (i.e., a "miss") as a result of a query of the cache management table in the global cache memory 220, such front-end director $180_1$-$180_{32}$ concludes that the requested data is in the bank of disk drives 140. Thus the front-end director $180_1$-$180_{32}$ that received the request for the data must make a request for the data from one of the back-end directors $200_1$-$200_{32}$ in order for such back-end director $200_1$-$200_{32}$ to request the data from the bank of disk drives 140. The mapping of which back-end directors $200_1$-$200_{32}$ control which disk drives $141_1$-$141_{32}$ in the bank of disk drives 140 is determined during a power-up initialization phase. The map is stored in the global cache memory 220. Thus, when the front-end director $180_1$-$180_{32}$ makes a request for data from the global cache memory 220 and determines that the requested data is not in the global cache memory 220 (i.e., a "miss"), the front-end director $180_1$-$180_{32}$ is also advised by the map in the global cache memory 220 of the back-end director $200_1$-$200_{32}$ responsible for the requested data in the bank of disk drives 140. The requesting front-end director $180_1$-$180_{32}$ then must make a request for the data in the bank of disk drives 140 from the map designated back-end director $200_1$-$200_{32}$. This request between the front-end director $180_1$-$180_{32}$ and the appropriate one of the back-end directors $200_1$-$200_{32}$ (as determined by the map stored in the global cache memory 200) is by a message which passes from the front-end director $180_1$-$180_{32}$ through the message network 260 to the appropriate back-end director $200_1$-$200_{32}$. It is noted then that the message does not pass through the global cache memory 220 (i.e., does not pass through the data transfer section 240) but rather passes through the separate, independent message network 260. Thus, communication between the directors $180_1$-$180_{32}$, $200_1$-$200_{32}$ is through the message network 260 and not through the global cache memory 220. Consequently, valuable bandwidth for the global cache memory 220 is not used for messaging among the directors $180_1$-$180_{32}$, $200_1$-$200_{32}$.

Thus, on a global cache memory 220 "read miss", the front-end director $180_1$-$180_{32}$ sends a message to the appropriate one of the back-end directors $200_1$-$200_{32}$ through the message network 260 to instruct such back-end director $200_1$-$200_{32}$ to transfer the requested data from the bank of disk drives 140 to the global cache memory 220. When accomplished, the back-end director $200_1$-$200_{32}$ advises the requesting front-end director $180_1$-$180_{32}$ that the transfer is accomplished by a message, which passes from the back-end director $200_1$-$200_{32}$ to the front-end director $180_1$-$180_{32}$ through the message network 260. In response to the acknowledgement signal, the front-end director $180_1$-$180_{32}$ is thereby advised that such front-end director $180_1$-$180_{32}$ can transfer the data from the global cache memory 220 to the requesting host computer processor $121_1$-$121_{32}$ as described above when there is a cache "read hit".

It should be noted that there might be one or more back-end directors $200_1$-$200_{32}$ responsible for the requested data. Thus, if only one back-end director $200_1$-$200_{32}$ is responsible for the requested data, the requesting front-end director $180_1$-$180_{32}$ sends a uni-cast message via the message network 260 to only that specific one of the back-end directors $200_1$-$200_{32}$. On the other hand, if more than one of the back-end directors $200_1$-$200_{32}$ is responsible for the requested data, a multi-cast message (here implemented as a series of uni-cast messages) is sent by the requesting one of the front-end directors $180_1$-$180_{32}$ to all of the back-end directors $200_1$-$200_{32}$ having responsibility for the requested data. In any event, with both a uni-cast or multi-cast message, such message is passed through the message network 260 and not through the data transfer section 240 (i.e., not through the global cache memory 220).

Likewise, it should be noted that while one of the host computer processors $121_1$-$121_{32}$ might request data, the acknowledgement signal may be sent to the requesting host computer processor $121_1$ or one or more other host computer processors $121_1$-$121_{32}$ via a multi-cast (i.e., sequence of uni-cast) messages through the message network 260 to complete the data read operation.

Considering a write operation, the host computer 120 wishes to write data into storage (i.e., into the bank of disk drives 140). One of the front-end directors $180_1$-$180_{32}$ receives the data from the host computer 120 and writes it into the global cache memory 220. The front-end director $180_1$-$180_{32}$ then requests the transfer of such data after some period of time when the back-end director $200_1$-$200_{32}$ determines that the data can be removed from such cache memory 220 and stored in the bank of disk drives 140. Before the transfer to the bank of disk drives 140, the data in the cache memory 220 is tagged with a bit as "fresh data" (i.e., data which has not been transferred to the bank of disk drives 140, that is data which is "write pending"). Thus, if there are multiple write requests for the same memory location in the global cache memory 220 (e.g., a particular bank account) before being transferred to the bank of disk drives 140, the data is overwritten in the cache memory 220 with the most recent data. Each time data is transferred to the global cache memory 220, the front-end director $180_1$-$180_{32}$ controlling the transfer also informs the host computer 120 that the transfer is complete to thereby free-up the host computer 120 for other data transfers.

When it is time to transfer the data in the global cache memory 220 to the bank of disk drives 140, as determined by the back-end director $200_1$-$200_{32}$, the back-end director $200_1$-$200_{32}$ transfers the data from the global cache memory 220 to the bank of disk drives 140 and resets the tag associated with data in the global cache memory 220 (i.e., un-tags the data) to indicate that the data in the global cache memory 220 has been transferred to the bank of disk drives 140. It is noted that the un-tagged data in the global cache memory 220 remains there until overwritten with new data.

Figure 4A:
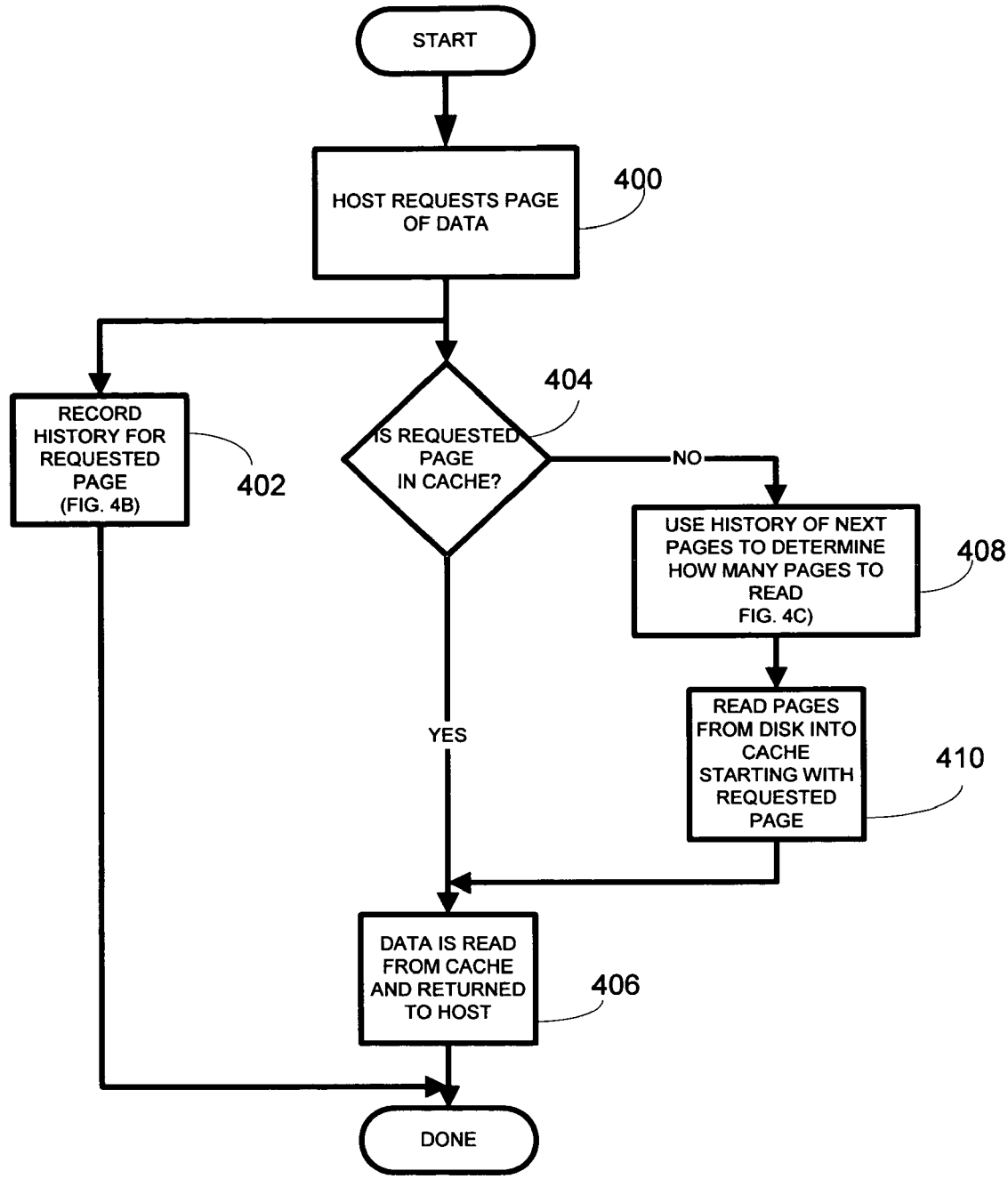
FIGS. 4A-4C are flow diagrams of a prefetch method used by the data storage system of FIG. 3 in accordance with the invention.

Referring now to FIG. 4A, a flow diagram of the prefetch method used by the data storage system 100, is shown. Thus, in STEP 400, the host computer/server (herein referred to as the host), requests a specific page. In STEP 402, a history record is generated for the requested page by a method described in more detail in FIG. 4B. Also, a determination is made as to whether the data in the requested page is in cache, STEP 404. If the data is in cache, i.e. a read hit, the data is read from cache and returned to the host, STEP 406. On the other hand, if the requested data in not in cache (i.e., a read miss), the history record of next pages is used to determine how many pages to read from disk, STEP 408, to be described in more detail in FIG. 4C. Then, in STEP 410, the method reads the pages determined from STEP 408 from disk into cache starting with the requested page and the process proceeds to STEP 406 and the data requested by the host is read from cache and returned to the host.

Figure 4B:
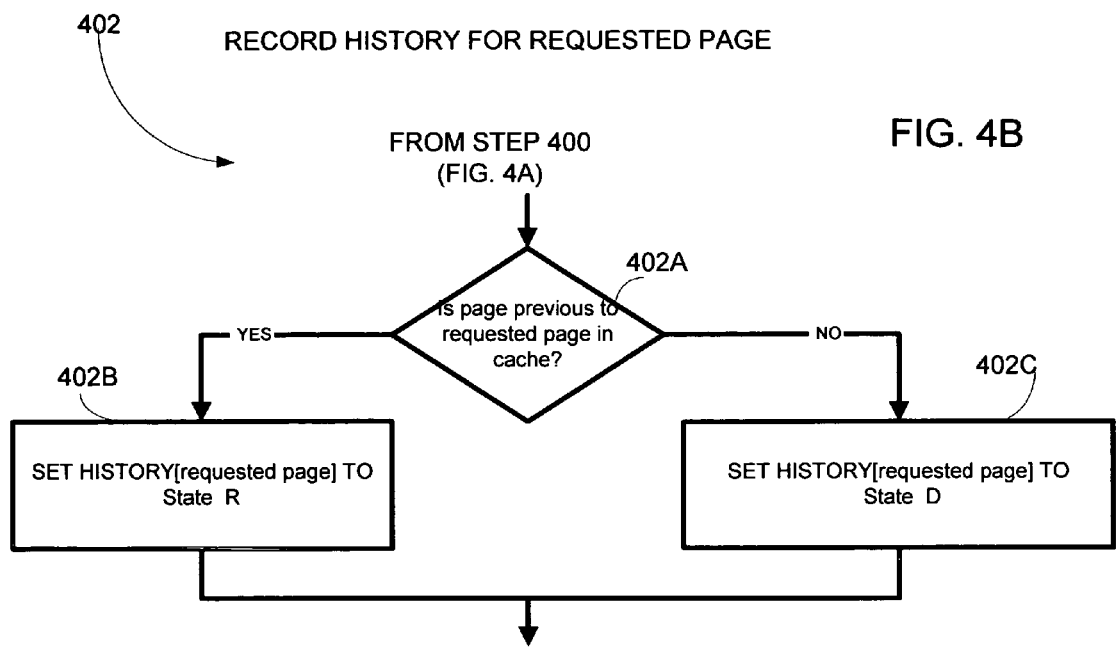

Referring now to FIG. 4B, the history record generation STEP 402 is shown in more detail. Thus, after a host requests a page of data in STEP 400 (FIG. 4A), the process determines whether the page previous to the requested page is in cache, STEP 402A. If the previous page is in cache, the process sets the history table for the requested page to a state R, i.e., read when the previous page is read, here stored in the table as binary 11. On the other hand, if the page previous to the requested page is not in cache (STEP 402A), the process sets the history table for the requested page to a state D, i.e., don't read when previous page is read, here stored in the table as binary 10, STEP 402C. The state of the history table for all pages for which STEP 402 has never been executed is state U, i.e., unknown, here stored in the table as binary 00.

Figure 4C:
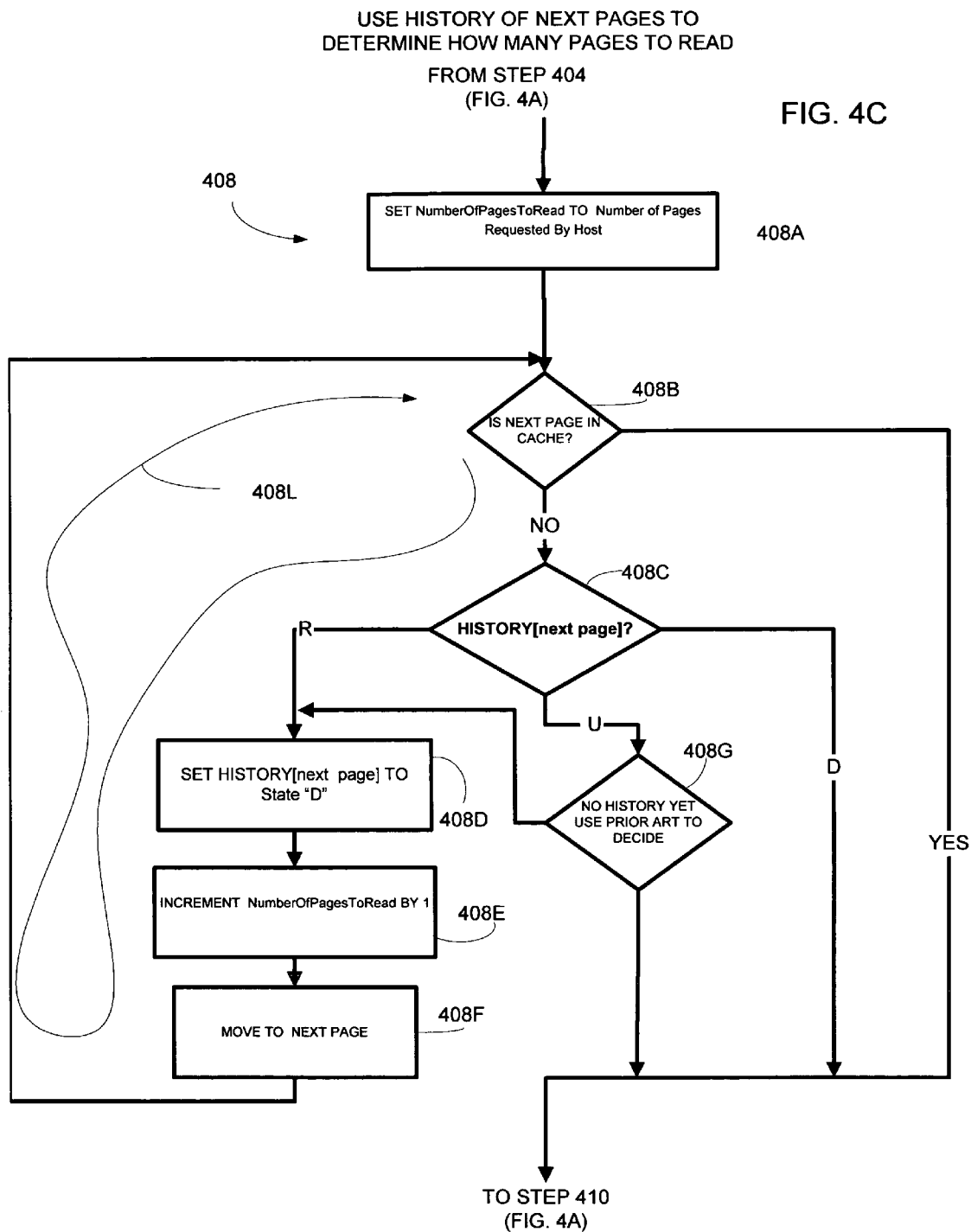

Referring now to FIG. 4C, using the history of next pages to determine how many pages to read, STEP 408 is shown in more detail. Thus, if the requested page was determined in STEP 404 not to be in cache, the process sets the number of pages to be read to the number of pages requested by the host computer, STEP 408A. The process then determines in STEP 408B whether the next page (i.e., the page one page number greater than the requested page) is in cache, STEP 408B. If the next page is in cache, the process proceeds to STEP 410, FIG. 4A, and reads pages (one page in this case, since this is the number of pages to be read set in STEP 408A) from disk into cache starting with the requested page which according to STEP 404 was not in cache and the process returns it to the host, STEP 406 FIG. 4A. Thus, in STEP 406, data in cache is read therefrom and returned to the host.

If in STEP 408B, FIG. 4C, it is determined that the next page was not in cache, the history table of the next page is read to determine the stored state of the next page (i.e., state D, state R or state U, STEP 408C.

If in STEP 408C the state of the next page is D, the process proceeds to proceeds to STEP 410, FIG. 4A, and reads pages (one page in this case since this is the number of pages to be read set in STEP 408A) from disk into cache starting with the requested page which according to STEP 404 was not in cache and the process returns it to the host, STEP 406 FIG. 4A. Thus, in STEP 406, data in cache is read therefrom and returned to the host.

Figure 1:
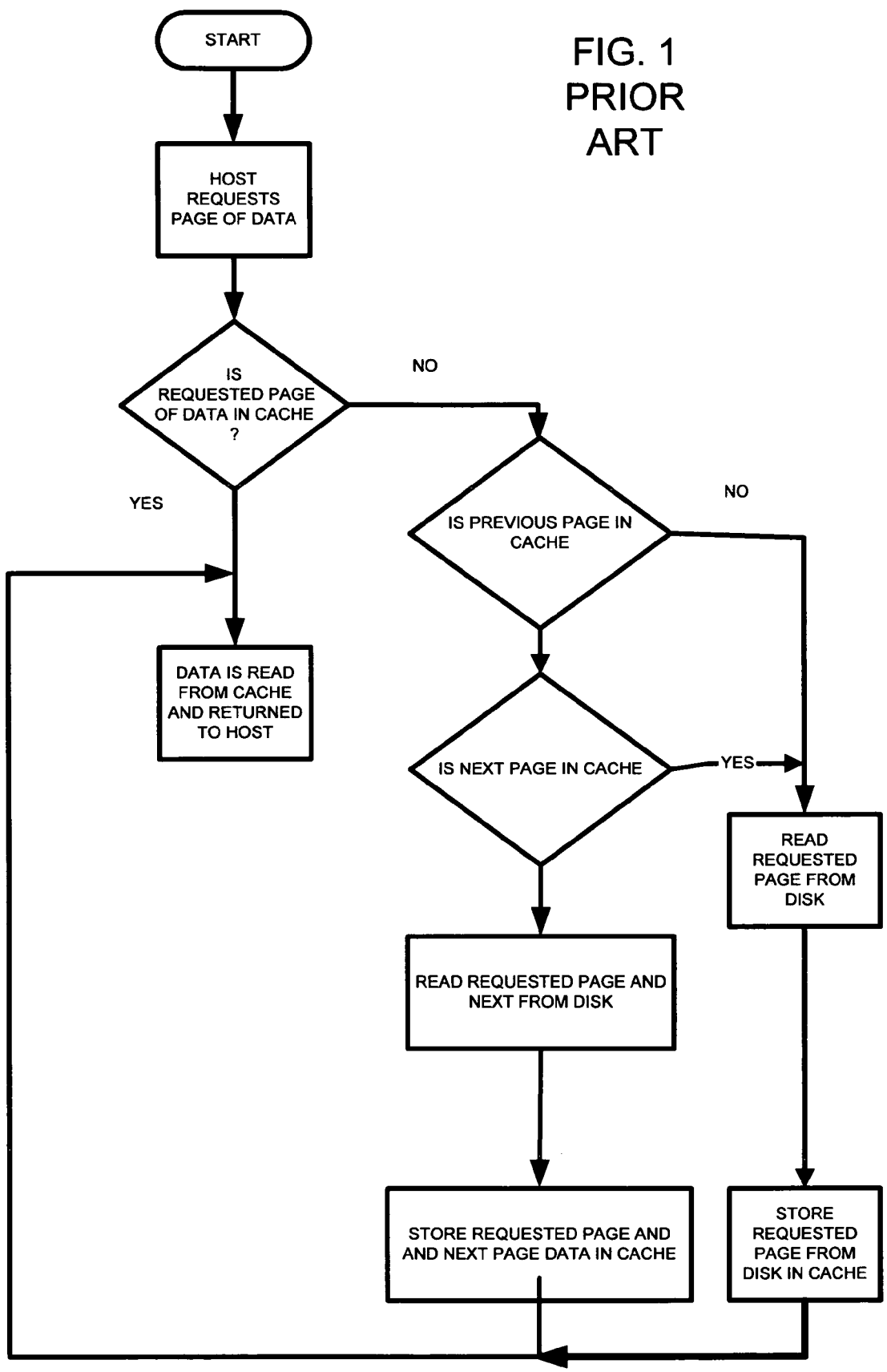
FIG. 1 is a flow diagram of a method used to prefetch data from a disk drive of a data storage system according to the PRIOR ART.
Figure 2:
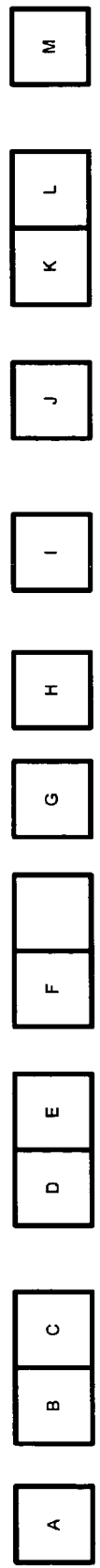
FIGS. 2A and 2B are diagrams useful in understanding the data prefetch performed in accordance with the method of FIG. 1.

If in STEP 408B, the state of the next page is U, there is no history and thus the process can use any suitable prefetch method (i.e., a prior art prefetch process) such as for example the method described in connection with FIG. 2. Then, the process proceeds to proceeds to STEP 410, FIG. 4A, and reads pages from disk into cache starting with the requested page which according to STEP 404 was not in cache and the process returns it to the host, STEP 406 FIG. 4A. Thus, in STEP 406, data in cache is read therefrom and returned to the host.

If in STEP 408C, the state of the next page is R, the history table for such next page is changed to state D, STEP 408D, the number of pages to be read is incremented by 1, STEP 408E, the process moves to the next page and thus returns to STEP 408B to form an iterative loop indicated by arrow 408L. After this loop is taken once, the "next page" referenced in STEP 408B will be the requested page +2.

The following illustrates an example of the prefetch method shown in FIGS. 4A-4C. Here the example will assume that the data A-M is stored in pages as shown in FIG. 2A. Thus, in this example, Data A through F are stored in successive disk drive pages 1 through 6, respectively, as shown in FIG. 2A. Data G is stored in page 21, data H in page 24, data I in page 23, data J in page 22, data K on page 25, data L in page 26 and data M in page 20, as shown.

EXAMPLE

History values: U Unknown (no history, use prior art prefetch), R—Read when previous page read, D—don't read The initial state of the history is unknown, and the cache starts out empty.

|  | 1 | 2 | 3 | 4 | 5 | 6 | 7 | ... | 20 | 21 | 22 | 23 | 24 | 25 | 26 | 27 | 28 | 29 |
|---|---|---|---|---|---|---|---|---|---|---|---|---|---|---|---|---|---|---|
| History Cached? | U | U | U | U | U | U | U |  | U | U | U | U | U | U | U | U | U | U |

Host Requests A (In page 1)—Set history for page 1 to state D since the previous page is not in cache. History for page 2 is "U", use Prior Art prefetch, Prior Art prefetch determines not to prefetch. Therefore one page, page 1, is read into cache.

|          | 1 | 2 | 3 | 4 | 5 | 6 | 7 | ... | 20 | 21 | 22 | 23 | 24 | 25 | 26 | 27 | 28 | 29 |
|----------|---|---|---|---|---|---|---|-----|----|----|----|----|----|----|----|----|----|----|
| History  | D | U | U | U | U | U | U |     | U  | U  | U  | U  | U  | U  | U  | U  | U  | U  |
| Cached?  | Y |   |   |   |   |   |   |     |    |    |    |    |    |    |    |    |    |    |

Host Requests B (In page 2)—Set history for page 2 to state R since page 1 is in cache. History for page 3 is "U", therefore use Prior Art to therefore pre-read C from page 3. Also, the history for the next page, page 3, is set to state D and the number of pages to be read is incremented by 1, therefore 2 pages, i.e., pages 2 and 3 are read into cache.

|          | 1 | 2 | 3 | 4 | 5 | 6 | 7 | ... | 20 | 21 | 22 | 23 | 24 | 25 | 26 | 27 | 28 | 29 |
|----------|---|---|---|---|---|---|---|-----|----|----|----|----|----|----|----|----|----|----|
| History  | D | R | D | U | U | U | U |     | U  | U  | U  | U  | U  | U  | U  | U  | U  | U  |
| Cached?  | Y | Y | Y |   |   |   |   |     |    |    |    |    |    |    |    |    |    |    |

Host Requests C (In page 3) Set history for page 3 to state R since page 2 is in cache.

|          | 1 | 2 | 3 | 4 | 5 | 6 | 7 | ... | 20 | 21 | 22 | 23 | 24 | 25 | 26 | 27 | 28 | 29 |
|----------|---|---|---|---|---|---|---|-----|----|----|----|----|----|----|----|----|----|----|
| History  | D | R | R | U | U | U | U |     | U  | U  | U  | U  | U  | U  | U  | U  | U  | U  |
| Cached?  | Y | Y | Y |   |   |   |   |     |    |    |    |    |    |    |    |    |    |    |

Host Requests D (In page 4). Set history for page 4 to state R since page 3 is in cache. History for page 5 is "U", therefore use Prior Art to Pre-fetch E from page 5. Also, the history for the next page, i.e., page 5, is set to state D and the number of pages to be read is incremented by 1, therefore 2 pages, i.e., Dazes 4 and 5 are read into cache.

|          | 1 | 2 | 3 | 4 | 5 | 6 | 7 | ... | 20 | 21 | 22 | 23 | 24 | 25 | 26 | 27 | 28 | 29 |
|----------|---|---|---|---|---|---|---|-----|----|----|----|----|----|----|----|----|----|----|
| History  | D | R | R | R | D | U | U |     | U  | U  | U  | U  | U  | U  | U  | U  | U  | U  |
| Cached?  | Y | Y | Y | Y | Y |   |   |     |    |    |    |    |    |    |    |    |    |    |

Host Requests; (in page 5) Set history for page 5 to state R since page 4 is in cache.

|          | 1 | 2 | 3 | 4 | 5 | 6 | 7 | ... | 20 | 21 | 22 | 23 | 24 | 25 | 26 | 27 | 28 | 29 |
|----------|---|---|---|---|---|---|---|-----|----|----|----|----|----|----|----|----|----|----|
| History  | D | R | R | R | R | U | U |     | U  | U  | U  | U  | U  | U  | U  | U  | U  | U  |
| Cached?  | Y | Y | Y | Y | Y |   |   |     |    |    |    |    |    |    |    |    |    |    |

Host request F (In page 6)—Set history for page 5 to state R since page 5 is in cache. History for page 7 is "U", therefore use Prior Art to Pre-fetch E from page 7. Also, the history for the next page, page 7, is set to state D and the number of pages to be read is incremented by 1, therefore 2 pages, i.e., pages 6 and 7 are read into cache.

|         | 1 | 2 | 3 | 4 | 5 | 6 | 7 | ... 20 | 21 | 22 | 23 | 24 | 25 | 26 | 27 | 28 | 29 |
|---------|---|---|---|---|---|---|---|--------|----|----|----|----|----|----|----|----|----|
| History | D | R | R | R | R | R | D |        | U  | U  | U  | U  | U  | U  | U  | U  | U  |
| Cached? | Y | Y | Y | Y | Y | Y | Y |        |    |    |    |    |    |    |    |    |    |

Host requests G (In page 21)—Set history of page 21 to state D since previous page (i.e., page 20) is not in cache. History for page 22 is "U", therefore use Prior Art prefetch, Prior Art prefetch determines not to prefetch, therefore 1 page, page 21, is read into cache.

|         | 1 | 2 | 3 | 4 | 5 | 6 | 7 | ... 20 | 21 | 22 | 23 | 24 | 25 | 26 | 27 | 28 | 29 |
|---------|---|---|---|---|---|---|---|--------|----|----|----|----|----|----|----|----|----|
| History | D | R | R | R | R | U | U |        | U  | D  | U  | U  | U  | U  | U  | U  | U  |
| Cached? | Y | Y | Y | Y | Y | Y | Y |        |    | Y  |    |    |    |    |    |    |    |

Host requests H (In page 24)—Set history of page 24 to state D since previous page (i.e., page 23) is not in cache. History for page 25 is "U", therefore use Prior Art prefetch, Prior Art prefetch determines not to prefetch, therefore 1 page, page 24, is read into cache.

|         | 1 | 2 | 3 | 4 | 5 | 6 | 7 | ... 20 | 21 | 22 | 23 | 24 | 25 | 26 | 27 | 28 | 29 |
|---------|---|---|---|---|---|---|---|--------|----|----|----|----|----|----|----|----|----|
| History | D | R | R | R | R | U | U |        | U  | D  | U  | U  | D  | U  | U  | U  | U  |
| Cached? | Y | Y | Y | Y | Y | Y | Y |        |    | Y  |    |    | Y  |    |    |    |    |

Host requests I (In page 23)—Set history for page 23 to state D since previous page (i.e., page 22) is not in cache. Page 24 is in cache, therefore no prefetch, therefore 1 page, page 23, is read into cache.

|         | 1 | 2 | 3 | 4 | 5 | 6 | 7 | ... 20 | 21 | 22 | 23 | 24 | 25 | 26 | 27 | 28 | 29 |
|---------|---|---|---|---|---|---|---|--------|----|----|----|----|----|----|----|----|----|
| History | D | R | R | R | R | R | U |        | U  | D  | U  | D  | D  | U  | U  | U  | U  |
| Cached? | Y | Y | Y | Y | Y | Y | Y |        |    | Y  |    | Y  | Y  |    |    |    |    |

Host requests J (In page 22)—Set history for page 22 to state R since page 21 is in cache. Page 23 is in cache, therefore no prefetch, therefore 1 page, page 22, is read into cache.

|         | 1 | 2 | 3 | 4 | 5 | 6 | 7 | ... 20 | 21 | 22 | 23 | 24 | 25 | 26 | 27 | 28 | 29 |
|---------|---|---|---|---|---|---|---|--------|----|----|----|----|----|----|----|----|----|
| History | D | R | R | R | R | R | U |        | U  | D  | R  | D  | D  | U  | U  | U  | U  |
| Cached? | Y | Y | Y | Y | Y | Y | Y |        |    | Y  | Y  | Y  | Y  |    |    |    |    |

Host requests K (In page 25)—Set history for page 25 to state R since previous page (i.e., page 24) is in cache. History for page 26 is "U", therefore use prior art to pre-fetch L from page 26. Also, the history for the next page, page 26, is set to state D and the number of pages to be read is incremented by 1, therefore 2 pages, i.e., pages 25 and 26 are read into cache.

| | 1 | 2 | 3 | 4 | 5 | 6 | 7 | ... | 20 | 21 | 22 | 23 | 24 | 25 | 26 | 27 | 28 | 29 |
|---|---|---|---|---|---|---|---|---|---|---|---|---|---|---|---|---|---|---|
| History | D | R | R | R | R | R | U | | | U | D | R | D | D | R | D | U | U | U |
| Cached? | Y | Y | Y | Y | Y | Y | Y | | | | Y | Y | Y | Y | Y | Y | | | |

Host requests L (In page 26)—Set history for page 26 to state R since previous page (i.e., page 25) is in cache. Cache hit, no prefetch.

| | 1 | 2 | 3 | 4 | 5 | 6 | 7 | ... | 20 | 21 | 22 | 23 | 24 | 25 | 26 | 27 | 28 | 29 |
|---|---|---|---|---|---|---|---|---|---|---|---|---|---|---|---|---|---|---|
| History | D | R | R | R | R | R | U | | | U | D | R | D | D | R | R | U | U | U |
| Cached? | Y | Y | Y | Y | Y | Y | Y | | | | Y | Y | Y | Y | Y | Y | | | |

Host requests M (In page 20)—Set history for page 20 to state D since previous page (i.e., page 19) is not in cache. Page 21 is in cache, therefore no prefetch, therefore 1 page, page 21, is read into cache.

| | 1 | 2 | 3 | 4 | 5 | 6 | 7 | ... | 20 | 21 | 22 | 23 | 24 | 25 | 26 | 27 | 28 | 29 |
|---|---|---|---|---|---|---|---|---|---|---|---|---|---|---|---|---|---|---|
| History | D | R | R | R | R | R | U | | | R | D | R | D | R | R | R | U | U | U |
| Cached? | Y | Y | Y | Y | Y | Y | Y | | | Y | Y | Y | Y | Y | Y | Y | | | |

Host stops requesting for a long time period, and cache pages are replaced with other data, so none of the pages shown are cached. Prior art pre-fetch would have no information on these pages.

| | 1 | 2 | 3 | 4 | 5 | 6 | 7 | ... | 20 | 21 | 22 | 23 | 24 | 25 | 26 | 27 | 28 | 29 |
|---|---|---|---|---|---|---|---|---|---|---|---|---|---|---|---|---|---|---|
| History | D | R | R | R | R | R | U | | | D | D | R | D | D | R | R | U | U | U |
| Cached? | | | | | | | | | | | | | | | | | | | |

Host Requests A (In page 1)—Page 1 history is set to state 'D' (no change) because previous page (page 0) is not in cache. The number of pages algorithm operates by first noting that page 2 is not in cache and the history for page 2 is in state R, therefore the process iterates through the loop 408L (FIG. 4C) to determine that pages 2-6 should be pre-read and because of this their history is set to state "D". Pages 1-6 are read into cache.

|         | 1 | 2 | 3 | 4 | 5 | 6 | 7 | ... | 20 | 21 | 22 | 23 | 24 | 25 | 26 | 27 | 28 | 29 |
|---------|---|---|---|---|---|---|---|-----|----|----|----|----|----|----|----|----|----|----|
| History | D | D | D | D | D | D | U |     | D  | D  | R  | D  | D  | R  | R  | U  | U  | U  |
| Cached? | Y | Y | Y | Y | Y | Y |   |     |    |    |    |    |    |    |    |    |    |    |

Host Requests B (In page 2)—Page 2 history is set to state 'R' because previous page (page 1) is in cache. No disk read or pre-fetch because page 2 is already in cache.

|         | 1 | 2 | 3 | 4 | 5 | 6 | 7 | ... | 20 | 21 | 22 | 23 | 24 | 25 | 26 | 27 | 28 | 29 |
|---------|---|---|---|---|---|---|---|-----|----|----|----|----|----|----|----|----|----|----|
| History | D | R | D | D | D | D | U |     | D  | D  | R  | D  | D  | R  | R  | U  | U  | U  |
| Cached? | Y | Y | Y | Y | Y | Y |   |     |    |    |    |    |    |    |    |    |    |    |

Host Requests C (In page 3) Page 3 history is set to state 'R' because previous page (page 2) is in cache. No disk read or pre-fetch because page 3 is already in cache.

|         | 1 | 2 | 3 | 4 | 5 | 6 | 7 | ... | 20 | 21 | 22 | 23 | 24 | 25 | 26 | 27 | 28 | 29 |
|---------|---|---|---|---|---|---|---|-----|----|----|----|----|----|----|----|----|----|----|
| History | D | R | R | D | D | D | U |     | D  | D  | R  | D  | D  | R  | R  | U  | U  | U  |
| Cached? | Y | Y | Y | Y | Y | Y |   |     |    |    |    |    |    |    |    |    |    |    |

Host Requests D (In page 4) Page 4 history is set to state 'R' because previous page (page 3) is in cache. No disk read or pre-fetch because page 4 is already in cache.

|         | 1 | 2 | 3 | 4 | 5 | 6 | 7 | ... | 20 | 21 | 22 | 23 | 24 | 25 | 26 | 27 | 28 | 29 |
|---------|---|---|---|---|---|---|---|-----|----|----|----|----|----|----|----|----|----|----|
| History | D | R | R | R | D | D | U |     | D  | D  | R  | D  | D  | R  | R  | U  | U  | U  |
| Cached? | Y | Y | Y | Y | Y | Y |   |     |    |    |    |    |    |    |    |    |    |    |

Host Requests E (in page 5)—Page 5 history is set to 'R' because previous page (page 4) is in cache. No disk read or pre-fetch because page 5 is already in cache.

|         | 1 | 2 | 3 | 4 | 5 | 6 | 7 | ... | 20 | 21 | 22 | 23 | 24 | 25 | 26 | 27 | 28 | 29 |
|---------|---|---|---|---|---|---|---|-----|----|----|----|----|----|----|----|----|----|----|
| History | D | R | R | R | R | D | U |     | D  | D  | R  | D  | D  | R  | R  | U  | U  | U  |
| Cached? | Y | Y | Y | Y | Y | Y |   |     |    |    |    |    |    |    |    |    |    |    |

Host request F (In page 6)—Page 6 history is set to state 'R' because previous page (page 5) is in cache. No disk read or pre-fetch because page 6 is already in cache.

|          | 1 | 2 | 3 | 4 | 5 | 6 | 7 | ... 20 | 21 | 22 | 23 | 24 | 25 | 26 | 27 | 28 | 29 |
|----------|---|---|---|---|---|---|---|--------|----|----|----|----|----|----|----|----|----|
| History  | D | R | R | R | R | R | U |        | D  | D  | R  | D  | D  | R  | R  | U  | U  | U |
| Cached?  | Y | Y | Y | Y | Y | Y |   |        |    |    |    |    |    |    |    |    |    |

Host requests G (In page 21). Page 21 history is set to state 'D' (no change) because previous page (page 20) is not in cache. The number of pages algorithm operates by first noting that page 22 is not in cache and the history for page 22 is in state R, therefore the process iterates through the loop 408L (FIG. 4A) to determine that page 22 should be pre-read and because of this its history is set to state 'D. Pages 21-22 are read into cache.

|          | 1 | 2 | 3 | 4 | 5 | 6 | 7 | ... 20 | 21 | 22 | 23 | 24 | 25 | 26 | 27 | 28 | 29 |
|----------|---|---|---|---|---|---|---|--------|----|----|----|----|----|----|----|----|----|
| History  | D | R | R | R | R | R | U |        | D  | D  | D  | D  | D  | R  | R  | U  | U  | U |
| Cached?  | Y | Y | Y | Y | Y | Y |   |        |    | Y  | Y  |    |    |    |    |    |    |

Host requests H (In page 24)—Page 24 history is set to state 'D' (no change) because previous page (page 23) is not in cache. The number of pages algorithm operates by first noting that page 25 is not in cache and the history for page 25 is in state R, therefore the process iterates through the loop 408L to determine that pages 25-26 should be pre-read and because of this their history is set to state 'D. Pages 24-26 are read into cache.

|          | 1 | 2 | 3 | 4 | 5 | 6 | 7 | ... 20 | 21 | 22 | 23 | 24 | 25 | 26 | 27 | 28 | 29 |
|----------|---|---|---|---|---|---|---|--------|----|----|----|----|----|----|----|----|----|
| History  | D | R | R | R | R | R | U |        | D  | D  | D  | D  | D  | D  | D  | U  | U  | U |
| Cached?  | Y | Y | Y | Y | Y | Y |   |        |    | Y  | Y  |    | Y  | Y  | Y  |    |    |

Host requests I (In page 23)—Page 23 history is set to state 'R' because previous page (page 22) is in cache. No prefetch because page 24 is already in cache. Page 23 is read into cache.

|          | 1 | 2 | 3 | 4 | 5 | 6 | 7 | ... 20 | 21 | 22 | 23 | 24 | 25 | 26 | 27 | 28 | 29 |
|----------|---|---|---|---|---|---|---|--------|----|----|----|----|----|----|----|----|----|
| History  | D | R | R | R | R | R | U |        | D  | D  | R  | D  | D  | D  | D  | U  | U  | U |
| Cached?  | Y | Y | Y | Y | Y | Y |   |        |    | Y  | Y  | Y  | Y  | Y  | Y  |    |    |

Host requests J (In page 22)—Page 22 history is set to state 'R' because previous page (page 21) is in cache. No disk read, because page 22 is already in cache.

|          | 1 | 2 | 3 | 4 | 5 | 6 | 7 | ... 20 | 21 | 22 | 23 | 24 | 25 | 26 | 27 | 28 | 29 |
|----------|---|---|---|---|---|---|---|--------|----|----|----|----|----|----|----|----|----|
| History  | D | R | R | R | R | R | U |        | D  | D  | R  | R  | D  | D  | D  | U  | U  | U |
| Cached?  | Y | Y | Y | Y | Y | Y |   |        |    | Y  | Y  | Y  | Y  | Y  | Y  |    |    |

Host requests K (In page 25)—Page 25 history is set to state 'R' because previous page (page 24) is in cache. No disk read, because page 25 is already in cache.

|          | 1 | 2 | 3 | 4 | 5 | 6 | 7 | ... 20 | 21 | 22 | 23 | 24 | 25 | 26 | 27 | 28 | 29 |
|----------|---|---|---|---|---|---|---|--------|----|----|----|----|----|----|----|----|----|
| History  | D | R | R | R | R | R | U |        | D  | D  | R  | R  | D  | R  | D  | U  | U  | U |
| Cached?  | Y | Y | Y | Y | Y | Y |   |        |    | Y  | Y  | Y  | Y  | Y  | Y  |    |    |

Host requests L (In page 26)—Page 26 history is set to state 'R' because previous page (page 25) is in cache. No disk read, because page 26 is already in cache.

|          | 1 | 2 | 3 | 4 | 5 | 6 | 7 | ... 20 | 21 | 22 | 23 | 24 | 25 | 26 | 27 | 28 | 29 |
|----------|---|---|---|---|---|---|---|--------|----|----|----|----|----|----|----|----|----|
| History  | D | R | R | R | R | R | U |        | D  | D  | R  | R  | D  | R  | R  | U  | U  | U |
| Cached?  | Y | Y | Y | Y | Y | Y |   |        |    | Y  | Y  | Y  | Y  | Y  | Y  |    |    |

Host requests M (In page 20)—Page 20 history is set to state 'D' (no change) because previous page (page 19) is in cache. Page 20 is read into cache.

|          | 1 | 2 | 3 | 4 | 5 | 6 | 7 | ... 20 | 21 | 22 | 23 | 24 | 25 | 26 | 27 | 28 | 29 |
|----------|---|---|---|---|---|---|---|--------|----|----|----|----|----|----|----|----|----|
| History  | D | R | R | R | R | R | U |        | D  | D  | R  | R  | D  | R  | R  | U  | U  | U |
| Cached?  | Y | Y | Y | Y | Y | Y |   |        | Y  | Y  | Y  | Y  | Y  | Y  | Y  |    |    |

If the host stopped issuing requests again the history table contents will be as shown below. Note that page 23 has a state 'R' rather than the state 'D' that it had after the initial sequence.

|          | 1 | 2 | 3 | 4 | 5 | 6 | 7 | ... 20 | 21 | 22 | 23 | 24 | 25 | 26 | 27 | 28 | 29 |
|----------|---|---|---|---|---|---|---|--------|----|----|----|----|----|----|----|----|----|
| History  | D | R | R | R | R | R | U |        | D  | D  | R  | R  | D  | R  | R  | U  | U  | U |
| Cached?  |   |   |   |   |   |   |   |        |    |    |    |    |    |    |    |    |    |

If the host then repeated the same request sequence a 3$^{rd}$ time, the same sequence of changes will occur for host requests A-F and in the 2$^{nd}$ time through the sequence. When G is requested, pages 21-23 will be read, rather than 21-22 as in the 2$^{nd}$ time though the sequence:

Host requests G (In page 21) Page 21 history is set to state 'D' (no change) because previous page (page 20) is not in cache. The number of pages algorithm operates by first noting that page 22 is not in cache and the history for page 22 is in state R, therefore the process iterates through the loop 408L (FIG. 4C) to determine that pages 22-23 should be pre-read and because of this their history is set to state "D". Pages 21-23 are read into cache.

|  | 1 | 2 | 3 | 4 | 5 | 6 | 7 | ... 20 | 21 | 22 | 23 | 24 | 25 | 26 | 27 | 28 | 29 |
|---|---|---|---|---|---|---|---|---|---|---|---|---|---|---|---|---|---|
| History | D | R | R | R | R | R | U |  | D | D | D | D | D | R | R | U | U | U |
| Cached? | Y | Y | Y | Y | Y | Y |  |  |  | Y | Y | Y |  |  |  |  |  |

Host requests H (In page 24)—Page 24 history is set to state 'R' (no change) because previous page (page 23) is not in cache. The number of pages algorithm operates by first noting that page 25 is not in cache and the history for page 25 is in state R, therefore the process iterates through the loop 408L to determine that pages 25-26 should be pre-read and because of this their history is set to state "D". Pages 24-26 are read into cache.

|  | 1 | 2 | 3 | 4 | 5 | 6 | 7 | ... 20 | 21 | 22 | 23 | 24 | 25 | 26 | 27 | 28 | 29 |
|---|---|---|---|---|---|---|---|---|---|---|---|---|---|---|---|---|---|
| History | D | R | R | R | R | R | U |  | D | D | D | D | R | D | D | U | U | U |
| Cached? | Y | Y | Y | Y | Y | Y |  |  |  | Y | Y | Y | Y | Y | Y |  |  |

When the host completes the reference to M on this third time though the sequence, the history for 22-26 will all be R.

|  | 1 | 2 | 3 | 4 | 5 | 6 | 7 | ... 20 | 21 | 22 | 23 | 24 | 25 | 26 | 27 | 28 | 29 |
|---|---|---|---|---|---|---|---|---|---|---|---|---|---|---|---|---|---|
| History | D | R | R | R | R | R | U |  | D | D | R | R | R | R | R | U | U | U |
| Cached? | Y | Y | Y | Y | Y | Y |  |  |  | Y | Y | Y | Y | Y | Y | Y |  |  |

Note that page 24 has a state 'R' rather than the state 'D' that it had after the initial sequence. If the host stopped issuing requests again:

|  | 1 | 2 | 3 | 4 | 5 | 6 | 7 | ... 20 | 21 | 22 | 23 | 24 | 25 | 26 | 27 | 28 | 29 |
|---|---|---|---|---|---|---|---|---|---|---|---|---|---|---|---|---|---|
| History | D | R | R | R | R | R | U |  | D | D | R | R | R | R | R | U | U | U |
| Cached? |  |  |  |  |  |  |  |  |  |  |  |  |  |  |  |  |  |

Then repeated the same request sequence a forth time, when G is requested, pages 21-26 will be read, rather than 21-22 as in the $2^{nd}$ time though the sequence, or 21-23 as in the third time through the sequence:

Host requests G (In page 21) Page 21 history is set to state 'D' (no change) because previous page (page 20) is not in cache. The number of pages algorithm operates by first noting that page 22 is not in cache and the history for page 22 is in state R, therefore the process iterates through the loop 408L to determine that pages 22-26 should be pre-read and because of this their history is set to state "D". Pages 21-26 are read into cache.

them to the host, Step 512F. The process then adjusts the host requests to reference only the pages found in Step 512D, Step 512G and the process proceeds to Step 504, FIG. 5A.

If, on the other hand, the process determined in Step 512B that the last page of the host was in cache, the method proceeds to Step 512C. In Step 512C, the process uses any well known technique to find all pages immediately previous to the last page of the request that are in cache, Step 512D. Next, in Step 512E, using such well-known technique, the process determines any pages not found in Step 512C and loads them into cache. Next, using any known technique, the

|         | 1 | 2 | 3 | 4 | 5 | 6 | 7 | ... | 20 | 21 | 22 | 23 | 24 | 25 | 26 | 27 | 28 | 29 |
|---------|---|---|---|---|---|---|---|-----|----|----|----|----|----|----|----|----|----|----|
| History | D | R | R | R | R | R | U |     | D  | D  | D  | D  | D  | D  | D  | U  | U  | U  |
| Cached? | Y | Y | Y | Y | Y | Y |   |     |    | Y  | Y  | Y  | Y  | Y  | Y  |    |    |    |

For this example, where the host repeatedly requests the sequence of pages, with a long time delay between sequences, in steady state 3 disk reads are required, versus 10 disk reads with the example prior art algorithm. In addition, the prior art example also read a page that was unused.

Figure 5A:
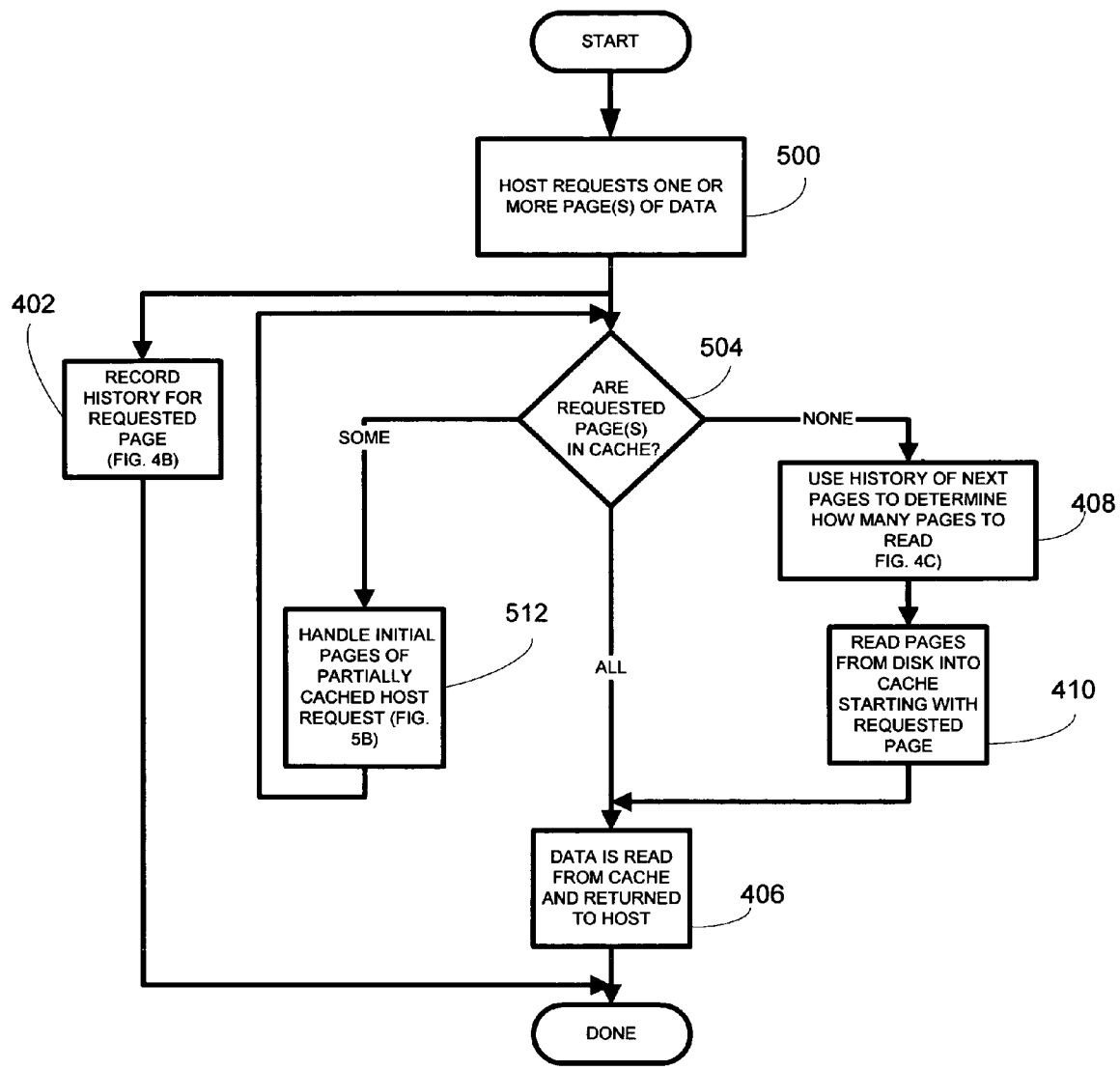
FIGS. 5A and 5B are flow diagrams of a prefetch method used by the data storage system of FIG. 3 in accordance with another embodiment of the invention.
Figure 5B:
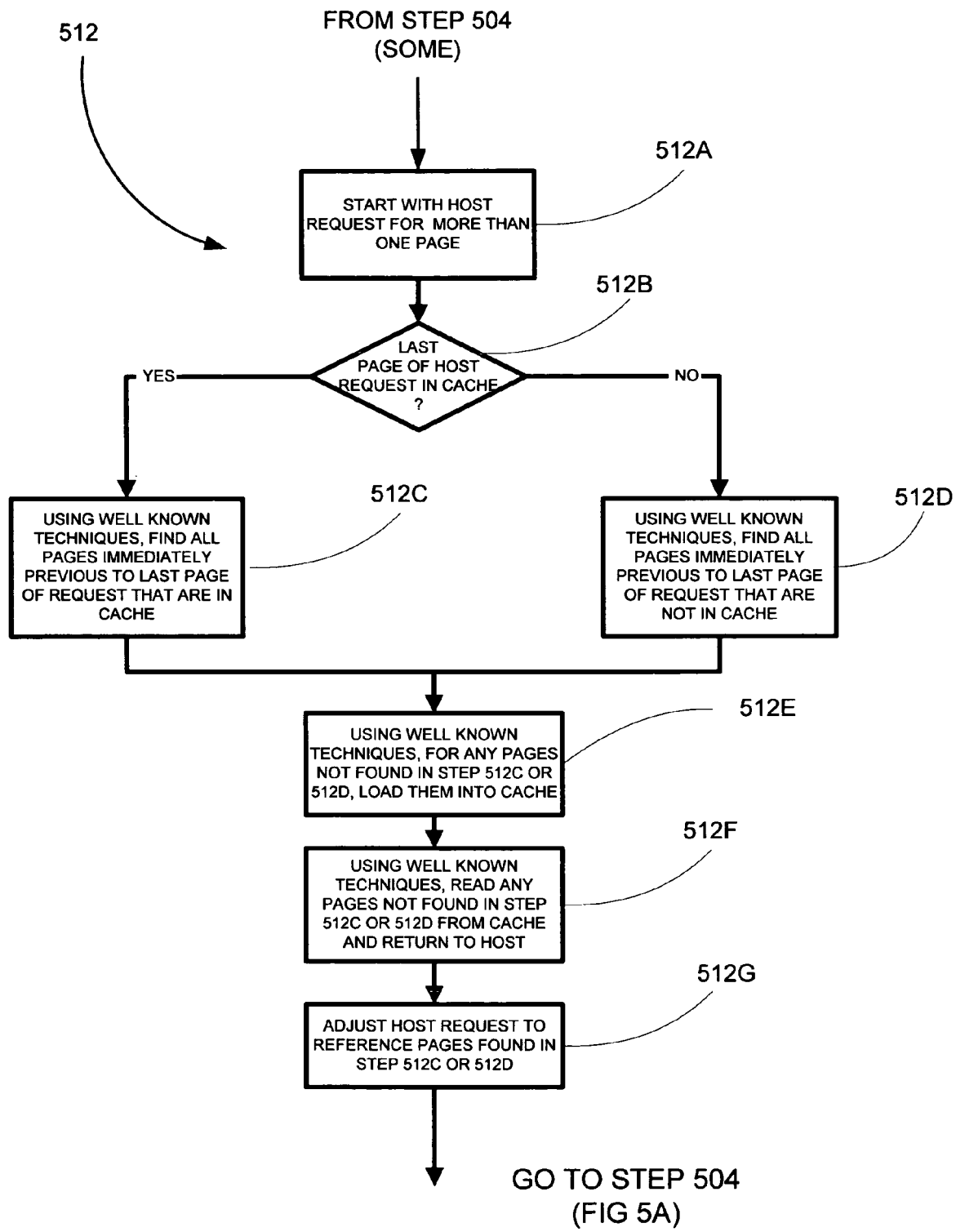

Referring now to FIGS. 5A and 5B, a method is shown which expands the method described above in connection with FIGS. 4A-4C to enable the host to read multiple pages. When a host requests to read multiple pages, it specifies the first page requested and the number of pages to read. Thus, referring to FIG. 5A, the host requests one or more page(s) of data, Step 500. The method determines whether the requested page(s) are in cache, Step 504. Also, the record history is generated as described in Step 402 of FIG. 4B.

If, in Step 504, all of the requested pages are in cache, the data is read from cache and returned to the host, as described in Step 406 in FIG. 4A.

If, in Step 504, it is determined that none of the requested page(s) is in cache, the process uses the history of the next page to determine how many pages to read as described above in Step 408 of FIG. 4C. The process then proceeds to Step 410 described above in FIG. 4A wherein the method reads the pages from disk into cache starting with the requested page and then, in Step 406, as described, the data is read from cache and returned to the host.

If, in Step 504 it is determined that only some of the requested pages are in cache, the method handles the initial pages of partially cached host requests in Step 512, to be described in more detail in FIG. 5B, and returns to Step 504 when either all or none of the remaining requested pages are in cache.

Referring now to FIG. 5B, the process for handling initial pages of partially cached host requests, (i.e., Step 512 of FIG. 5A) begins after Step 504, FIG. 5A determines that only some of the requested pages are in cache. Thus, in Step 512A, the method starts with the host requests for more than one page. Then, in Step 512B, the method determines whether the last page of the host requested pages is in cache. If not, the process uses any well known technique to find all pages immediately previous to the last page of the request that are not in cache, Step 512D. Next, in Step 512E, using such well-known technique, the process determines any pages not found in Step 512D and loads them into cache. Next, using any known technique, the process reads any pages not found during Step 512D from cache and returns process reads any pages not found during Step 512C from cache and returns them to the host, Step 512F. The process then adjusts the host requests to reference only the pages found in Step 512D, Step 512G and the process proceeds to Step 504, FIG. 5A.

Figure 6A:
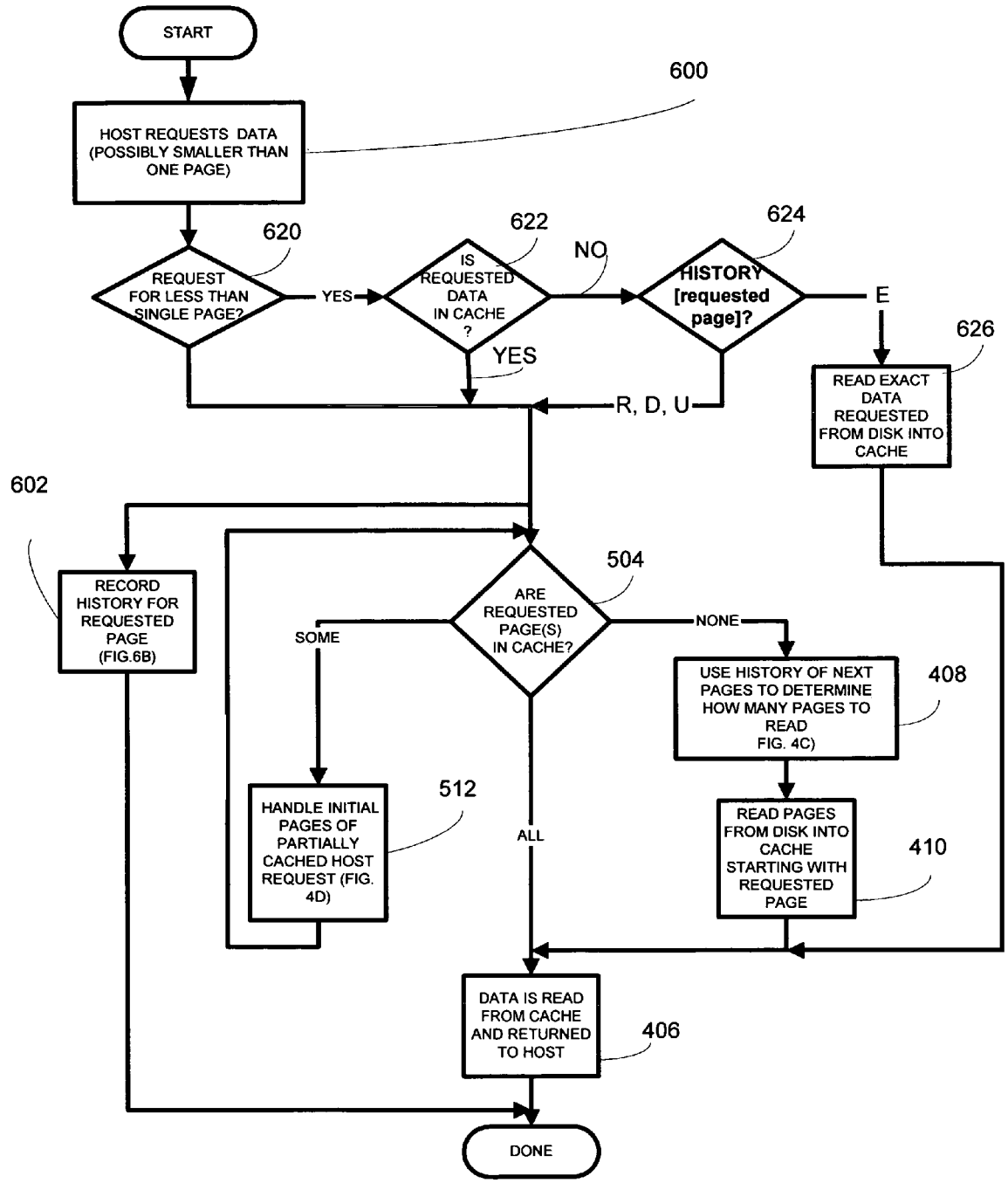

Referring now to FIGS. 6A and 6B, a method is shown which expands the method described above in connection with FIGS. 4A-4C and FIGS. 5A-5B to enable the host to also read a partial page. Thus, in Step 600, the host requests data possibly smaller than an entire page. In Step 620, the process determines whether the request is for less than a single page. If not, the process proceeds to Step 504 as described above in connection with FIG. 5A. Thus, the method proceeds through Steps 408, 410 and 406 (described above in connection with FIG. 5A) if none of the requested pages are in cache or the method proceeds to Step 512 (described above in connection with FIG. 5A) if some of the pages are in cache.

It is also noted that the record history for the requested page is also determined, Step 602, as will be described in more detail in FIG. 6B.

If, however in Step 620, it is determined that the request is for less than a single page, the process proceeds to Step 622. In Step 622, the process determines whether the requested data is in cache. If it is in cache, the process proceeds to Step 504 as described above.

It is also noted that the record history for the requested page is also determined, Step 602, as will be described in more detail in FIG. 6B.

If, however, the process determines that the requested data is not in cache, the process uses the history for the requested page, Step 624, such history having been generated in Step 602, to be described. Suffice it to say here that the history for the requested page can produce one of four responses: State (U)=Unknown; State (D)=Don't read when previous page is read; State (R)=Read when previous page is read (R); or State (E)=Don't read when previous page is read but rather read exactly the requested data.

If the history indicated in Step 624 either a State (R), State (D) or State (U), the process proceeds to Step 504 as described above and the record history for the requested page is also determined, Step 602, as will be described in more detail in FIG. 6B.

On the other hand, if the history determines in Step 624 State (E), the process, in Step 626, reads the exact data requested from the disk into the cache and the process then proceeds to Step 406 as described above. It is also noted that the history will not be changed.

Referring now to FIG. 6B, the details of Step 602 are shown for recording the history for the requested page. Thus, from either Step 620, 624 or 622 (FIG. 6B), the process determines in Step 602A whether the page previous to the requested page is in cache. If it is, the process sets the history for the requested page to state (R), Step 602B. If in Step 602A the process determines that the page previous to the requested page is in not in cache, the process determines, in Step 602E whether the requested page is in cache. If it is in cache, the process set the history for the requested page to State (D), Step 602C. However, if in Step 602E the process determines that the requested page is not in cache, the process sets the history state for the requested page to State E, Step 602F.

A number of embodiments of the invention have been described. Nevertheless, it will be understood that various modifications may be made without departing from the spirit and scope of the invention. Accordingly, other embodiments are within the scope of the following claims.

What is claimed is:

1. A pre-fetch method for a data storage system having a disk drive and a cache memory, comprising:

generating a history as pages are requested from the disk drive for storage in the cache memory, such history for each one of the pages requested indicating whether the page previous to the requested one of the pages was in the cache memory when the history was generated, different pages being on different positions on the disk drive; and provide in such generated history for each requested one of the pages either a first designation for the requested one of the pages if the page previous to the requested one of the pages is in the cache memory or a second designation if the page previous to the requested one of the pages is not in the cache memory; and subsequently to such history generation, determine, when said one of the pages is again requested, the number of pages to be read from the disk drive into the cache memory, the number of pages to be read being determined, when the page in a position next to the requested one of the pages is not in cache memory, from the provided first or second designations of said page in the position next to the requested page.

2. A pre-fetch method for a data storage system having a disk drive and a cache memory, comprising:

generating a history as pages are requested from the disk drive for storage in the cache memory, such history for each one of the pages requested indicating whether the page previous to the requested one of the pages was in the cache memory when the history was generated, different pages being on different positions on the disk drive; and providing in such generated history for each one of the requested pages either a first designation for the requested one of the pages if the page previous to the requested one of the pages is in the cache memory or a second designation if the page previous to the requested one of the pages is not in the cache memory; and subsequently to such history generation, determine, when said one of the pages is again requested, the number of pages in addition to the requested pages to be read from the disk drive into the cache memory, the number of pages to be read being determined, when a next page, such next page being in a position next to the requested one of the pages, is not in cache memory and has the first designation, by incrementing the position of the next page and the number of pages to be read until said next page is either in the cache memory or has the second designation.

* * * * *